3,391,131
PROCESS OF TREATING CYTOCHROME C TO INCREASE ENZYMATIC ACTIVITY
Rudolf K. Zahn, Frankfurt am Main, Germany, assignor to Heinrich Mack Nachf, Illertissen, Bavaria, Germany
No Drawing. Filed Jan. 12, 1965, Ser. No. 425,047
8 Claims. (Cl. 260—115)

ABSTRACT OF THE DISCLOSURE

Process for increasing the enzymatic activity of cytochrome C which comprises heating an aqueous solution of between about 0.3 and 6% by weight of cytochrome C for not more than about 20 minutes to a temperature between about 50 and 95° C., and thereafter cooling the solution with rapid initial decrease of temperature by at least 2–3° C. In an embodiment of the process, in which the solution contains inorganic salts, imparting to the solution an ionic strength of about 0.04 to 0.15, the heating should not exceed about 80° C.

---

Various processes have been developed for the manufacture and refining of cytochrome C. it is well known by those skilled in this particular art that the biological activity exhibited by cytochrome C is greatly dependent on the manner in which it has been produced. It is furthermore well established that the activity of cytochrome C decreases upon storage and that purification and refining treatments detrimentally affect the activity.

The same applies, generally, to crystallized cytochrome C whose biological activity also differs in dependence on the manufacturing methods. The crystallization state may at best offer an indication in regard to the purity of the product. However, the chemical purity of cytochrome C is by no means a measure in respect to its enzymatic activity.

It is a primary object of this invention to provide a process for increasing the enzymatic activity of cytochrome C and to remove pyrogens from it, which process is applicable independent from the manner in which the cytochrome C has been produced or from where it emanates.

It is also an object of this invention to provide a process for increasing thee enzymatic activity of cytochrome C which results in an activated product of long shelf life.

Another object of this invention is to provide a process of the indicated kind which is simple to carry out, does not require elaborate and expensive equipment and results in a product of superior quality.

Generally, it is an object of this invention to improve on the art of cytochrome C refinement as presently practiced.

Briefly, and in accordance with this invention, cytochrome C which may have been produced in any suitable manner is heated in the form of an aqueous solution of between about 0.3 to 6% by weight concentration to a temperature of between about 50 to 95° C., whereafter the solution is cooled.

If the solution is salt-free, and merely consists of cytochrome C dissolved in distilled water, the heating may be effected to about 100° C., preferably about 95° C. If the solution, however, contains salts so that the solution has an ionic strength of about 0.04 to 0.15, the heating should be effected to a slightly lower temperature of about 50 to 80° C. Generally, brief heating periods suffice. In any event, the heating should not last longer than about 20 minutes.

The heated solution is thereafter cooled. The cooling should be effected in such a manner that the temperature of the heated solution is rapidly decreased by at least 2 to 3° C. Once this initial cooling step has been effected, it is of no consequence whether the further cooling to room temperature or lower temperatures takes a long or short time.

It should be emphasized that boiling of a cytochrome C solution, as has previously been suggested in the art, does not cause the desired activation of the final product and boiling should therefore be avoided.

The inventive method is extremely simple to carry out and results in a cytochrome C product of great enzymatic activity with the pyrogens completely removed.

The cooled solution, if desired after desalting by dextran may be recovered by lyophilization. However, it is feasible to leave the cytochrome C in the solution in which event, however, the solution should be sterilized by passing it through a degermination filter.

Without wanting to be limited to any theories, it is believed that the inventive activation and pyrogen removal effect is based on the following concepts on considerations:

It would appear that four factors are critical for obtaining the desired result and thus have to be considered. These four factors are as follows:

(1) The concentration of the cytochrome C in the aqueous solution;
(2) The salt content in the solution which may be expressed in terms of ionic strength;
(3) The temperature to which the solution is heated, and
(4) The heating period.

These four factors are mutually dependent upon each other and variation of one of the factors causes a change in at least one of the others. The values for these four factors should be tuned to each other in such a manner that a maximum activation effect is obtained with a minimum of side effects or decomposition tendency. When the cytochrome C and salt concentrations increase in the solution, the heating temperature and the heating period may be reduced. Any denaturation or decomposition can be recognized by precipitation of the active material and the concentration decrease in the solution resulting therefrom.

Extensive experiments have established that the upper and lower limit values for the four factors enumerated above are as follows:

(1) Cytochrome C concentration in the solution: 0.3 to 6% by weight.
(2) Ionic strength: 0.04 to 0.15.
(3) Temperature: 50 to 95° C.
(4) Heating period: 0 to 20 minutes.

The term "ionic strength" is used herein in its usual meaning. It may be expressed by the formula $$I = \tfrac{1}{2} \Sigma (m_1 \cdot z_i^2)$$

In this formula, I stands for the ionic strength, $m_1$ is the molarity and $z_i$ is the charge number. In Van Nostrand's International Encyclopedia of Chemical Science, 1964, page 621, "ionic strength" is defined as "A mathematical quantity used to evaluate the effectiveness of the forces restricting the freedom of ions in a solution, and defined as one-half the sum of the terms obtained by multiplying the total concentration of each ion by the square of its charge number, i.e., $$\mu = \tfrac{1}{2} \Sigma C_1 Z_1^2$$

where $\mu$ is the ionic strength, C is ionic concentration and Z is charge number. The concentration term may be replaced by molality (or molarity)."

In order to obtain the desired ionic strength of 0.04 to 0.15, neutral alkali metal salts or ammonium salts are preferred. Sodium chloride is an exceptionally suitable salt for this purpose.

As previously mentioned, the cooling of the solution after completed heating may be effected in any suitable manner provided that substantially immediately after termination of the heating the temperature of the solution is rapidly reduced by at least 2 to 3° C.

If sodium chloride is the electrolyte, i.e. the salt which imparts the solution with the ionic strength, a 0.47% solution of sodium chloride corresponds to an ionic strength of 0.04 while a 1.75% solution corresponds to an ionic strength of 0.15.

Concerning the heating period, it will be noted that a period of from 0 to 20 minutes has been stated. The expression "0 minutes" in this context is deemed to refer to a heating procedure wherein the solution is immediately cooled after the final desired temperature has been obtained, while with the expression "20 minutes," it is meant that the solution is allowed to remain at the highest temperature for 20 minutes.

The invention will now be described by several examples, it being understood, however, that these examples are given by way of illustration and not by way of limitation and that many changes may be effected in the process conditions in general without affecting in any way the scope and spirit of this invention as recited in the appended claims.

Example I

This experiment was carried out with a cytochrome C in powder form prepared according to Keilin and Hartree as reported in "Biochem. Prep." vol. II, pp. 3 and 4, 1952. A 4% by weight solution in pure distilled water of this cytochrome C was prepared. The pH of the solution was about 6.5. The solution was heated within 30 seconds to about 95° C. and the temperature was maintained at this value for about 5 minutes. The solution was thereupon rapidly cooled down to room temperature. A slight precipitation was observed which was removed by centrifuging or filtration. This precipitate was analyzed and found to contain inactive proteins and pyrogenic substances. The cytochrome C in the solution was recovered by lyophilization and exhibited, as compared to the original starting material, an increased reduction speed and increased reducibility. No pyrogen reactions could be detected. The individual results for a typical batch are tabulated in the following Table I.

If the optical density of a wave length of 546 m$\mu$ by the batch according to Table I is determined in dependence on time, it is found that the optical density at first strongly rises and then has a tendency to assume a constant value. The initial rise and the final value of cytochrome C treated in accordance with the invention are larger than with untreated cytochrome C.

The respective final value obtained is a measure for the total cytochrome C moiety in the batch which can be enzymatically reduced. The respective rise is a measure for the reduction speed.

In evaluating the result, it should be considered that a cytochrome C batch whose reducible moiety is large, but in which the reduction takes place slowly, has a lower biological value than a batch whose reducible moiety is smaller, but in which the reduction takes place more rapidly.

In the batch according to Table I, the ratio of the optical density rises of the batches which have been treated in the inventive manner to the batches with untreated cytochrome C (calculated on the basis of the tangent of the angle of the optical density curves relative to the time axis which tangent has been interpolated at the time period 0) amounts to $$\frac{tg\alpha \text{ (treated)}}{tg\alpha \text{ (untreated)}} = \frac{0.88}{0.33} = 2.96$$

This means that the reduction speed has risen to a multiple of 2.96.

In addition, an increase of that cytochrome C moiety which can be enzymatically reduced can be observed in each instance. This demonstrates that the inventive process in fact raises or increases the activity of the cytochrome C and not only causes the removal of inactive components from the cytochrome C starting material.

Example II

This experiment was carrried out in the same manner as described in connection with Example I. However, the distilled water not only contained the cytochrome C, but also sodium chloride in an amount so as to impart the solution an ionic strength of about 0.04 to 0.15. The heating was effected to a temperature of about 50 to 80° C. The lower the ionic strength, the higher the temperature. The higher the ionic strength, the lower the

TABLE I

| Cytochrome C | Hydrosulfite reducibility (percent) [1] | D-lactic acid Reductase-Test (percent) [2] | Glucose-6-Phosphatede-hydrogenase (percent) [3] | Reduction [4] velocity Glucose 6-Phosphate dehydrogenase (mole/min.) [3] | CO-Test [5] or Autoxydability (percent) [5] |
|---|---|---|---|---|---|
| Untreated | ca 100 | ca 60 | ca 60 | ca 3.10⁻⁹ | 15–35 |
| Heat treated | 100 | 95 | 90 | 5.10⁻⁹ | 10 |

[1] K. G. Paul: Cytochrome C (Mammals). Methods in Enzymilogy II/749 (1955).
[2] C. Gregolin, T. P. Singer (H. Ford Hosp. Detroit, Mich.) The D-lactic Cytochrome C Reduction of Yeast: its chemical nature, origins and relation to the respiratory chain. Biochem. Biophys. Res. Comm.[4] 189 (1961).
[3] H. R. Mahler, N. K. Sarkar and L. P. Vernon: J. Biol. Chem. 199/585 (1952).
[4] Limited by Cytochrome C-TPN-Reductase to 5.10⁻⁹ mole/minute.
[5] C. L. Tsou: Cytochrome C modified by digestion with proteolytic enzymes. Biochem. J. 49/362 (1951)

TYPICAL BATCH

| Substance | Concentration | Ml. | Quantity absolute 10⁻⁶ | Mole |
|---|---|---|---|---|
| Glucose-6-phosphate | 25 n mol/ml | 0.1 | 650 | 2.5.10⁻⁶ |
| Zwischenterment | 4 mg.ml | 0.02 | 80 | |
| TPN | 1.1 n.mol/m | 0.05 | 46 | 5.5.10⁻⁸ |
| Cytochrome C | 4.10⁻⁷ mol/ml | 0.06 | 312 | 24.10⁻¹² |
| Cytochrome C-Reductase | 1.1–10⁻¹⁰ mol/ml | 0.04 | 0.29 | 4.4.10⁻¹² |
| Phosphate buffer 0.2 m. pH 7.55 | 5.10⁻⁵ mol/ml | 1.25 | | |

EXAMPLES OF THE PYROGEN-TEST OF UNTREATED AND HEAT TREATED CYTOCHROME C SOLUTIONS

| Charge | Concentration (mol/ml.) | Temperature division in C° individual measured amount | Average value |
|---|---|---|---|
| 0303 | 1.5.10⁻⁶ | Untreated, 1.2–1.2–1.5 | 1.3 |
| | | Heat treated, 0.4–0.4–0.2 | 0.33 |
| 219234 | 2.5.10⁻⁷ | Untreated, 1.5–1.3–1.1 | 1.3 |
| | | Heat treated, 0.3–0.3–0.3–0.2 | 0.27 |
| 1108 | 1.8.10⁻⁷ | Untreated, 1.5–1.5–1.5–1.3 | 1.4 |
| | | Heat treated, 0.2–0.3–0.6 | 0.37 | temperature. Thus, with an ionic strength of about 0.15, a temperature of about 50° may be sufficient, while with an ionic strength of 0.04 a temperature of about 80° C. is to be preferred. As previously mentioned, the temperature is also dependent on the cytochrome concentration in the solution. Otherwise, the procedure was the same as in Example I.

Examples III–V

The following tests were carried out with a view to ascertaining whether the inventive process is applicable to the various cytochrome C preparations as they are presently available and also to determine whether boiling of the solution results in an activity increase of the preparations. To this end, the following cytochrome C preparations were examined.

(a) Preparation according to Margoliash as reported in Mod. Biochem. I. 56, 529 (1954).

(b) Preparation according to Hagihara et al. as reported in Chem. Zentralblatt 6169 (1957).

(c) Preparation according to Keilin-Hartree as reported in Biochem. I.S. 289 (1945).

(d) Preparation according to Keilin-Hartree as reported in Proc. Roy. Soc. 22,298 (1937).

The results are tabulated in the following Table II:

TABLE II

| Preparation | Inventive treatment | Heating (deg.) | Heating Period (min.) | Reducibility (percent) | Reduction Speed (percent) |
|---|---|---|---|---|---|
| (a) | No | | | 95.74 | 100 |
| | Yes | 100 | 2 | 99.34 | 98 |
| (b) | No | | | 59.48 | 100 |
| | Yes | 70 | 2 | 77.48 | 155.86 |
| (c) | No | | | 98.68 | 100 |
| | Yes | 70 | 2 | (1) | 108.27 |
| (d) | No | | | 59.50 | 100 |
| | Yes | 70 | 2 | 84.00 | 133.63 |

1 Not ascertained.

The term "reducibility" as used herein is deemed to refer to that portion of the cytochrome C in the preparation which can be enzymatically reduced. In determining the reduction speed as used herein, the above defined conditions and ratio of the tg α have to be considered wherein the tg α of the untreated preparations has been assumed to be equal to 100%.

Examination of preparation a demonstrates that boiling does not yield the desired result.

Examination of preparations b through d clearly shows that in each case the employment of the inventive process causes an increase in the reducibility and of the reduction speed and thus of the biological activity.

Example VI

This experiment was carried out with a solution essentially consisting of 5.8% by weight of cytochrome C in distilled water, the solution having an ionic strength of 0.15. The ionic strength was imparted to the solution by ammonium chloride. The solution was heated within about 8 minutes to 51° C. and the solution was maintained at that temperature for about 30 seconds. The solution was then cooled so as to reduce the temperature rapidly to 48° whereafter the solution was allowed to stand for further cooling.

Example VII

A 6% by weight solution of cytochrome C in distilled water and having an ionic strength of 0.04 was heated within about 15 minutes to 59° C. The solution was maintained at this temperature for about 3 minutes, whereafter rapid cooling was effected.

Example VIII

This test was carried out with an aqueous solution of 1% by weight of cytochrome C in distilled water. The ionic strength of the solution imparted by potassium sulfate was 0.08. The solution was heated within 4 minutes to about 75° C. As soon as this temperature has been reached, the solution was rapidly cooled.

Example IX 0.3 grams of cytochrome C were dissolved in 97.7 grams of distilled water. No salt was contained in the solution so that the ionic strength was 0. The solution was then heated within 8 minutes to 98° C., was maintained at this temperature for about 2 minutes and thereafter cooled. The cooling was effected so that a rapid decrease to 94° was effected.

The cytochrome C used in Examples VI–IX was a preparation obtained from the heart muscle of horses.

While specific embodiments of the invention have been shown and described in detail to illustrate the application of the inventive principles, it will be understood that the invention may be embodied otherwise without departing from such principles.

What is claimed is:

1. A process of increasing the enzymatic activity of cytochrome C, which comprises heating an aqueous salt-free solution of between about 0.3 to 6% by weight of cytochrome C for not more than about 20 minutes to a temperature between about 50–95° C. and cooling the solution.

2. A process as claimed in claim 1, wherein the solution is cooled so that the temperature of the solution upon completed heating is rapidly decreased by at least 2–3° C.

3. A process of increasing the enzymatic activity of cytochrome C, which comprises subjecting an aqueous solution of about 0.3–6% by weight of cytochrome C, said solution additionally containing at least one inorganic salt imparting to said solution an ionic strength of about 0.04–0.15, to a heat treatment at a temperature of about 50–80° C. for not more than about 20 minutes and thereafter cooling the solution, the cooling being carried out so that the temperature of the solution rapidly decreases by at least 2–3° C.

4. A process as claimed in claim 3, wherein said salt is selected from the group consisting of essentialy neutral alkali metal salts and ammonium salts.

5. A process as claimed in claim 3, wherein said salt is sodium chloride.

6. A process as claimed in claim 3, wherein the heating is effected to a temperature of about 50–55° C.

7. A process as claimed in claim 3, wherein the aqueous solution contains about 0.3–1.0% by weight of cytochrome.

8. A process as claimed in claim 3, which comprises filtering the solution after the first rapid cooling.

References Cited

Chem. Abstracts, vol. 53, 1959, 9300g, Yamanaka et al.
Chem. Abstracts, vol. 41, 1947, 2093f-g, Roche et al., from Comptes Rendus.

WILLIAM H. SHORT, *Primary Examiner.*

H. SCHAIN, *Assistant Examiner.*